United States Patent [19]

Kouda et al.

[11] Patent Number: 5,010,923
[45] Date of Patent: Apr. 30, 1991

[54] STRUCTURE OF AN ELECTROMAGNETIC VALVE FOR OPENING AND CLOSING A FLUID FLOW PASSAGE

[75] Inventors: Masanori Kouda; Minoru Suzuki; Tetsuya Ohamura; Toshihisa Tobisawa, all of Kanagawa, Japan

[73] Assignee: Atsugi Motor Parts Company, Limited, Kanagawa, Japan

[21] Appl. No.: 127,193

[22] Filed: Dec. 1, 1987

[51] Int. Cl.$^5$ ............................................. F16K 11/04
[52] U.S. Cl. .............................. 137/625.34; 251/282; 251/129.02
[58] Field of Search ................... 137/625.34; 251/282, 251/129.02, 625.48

[56] References Cited

U.S. PATENT DOCUMENTS

| 690,979 | 1/1902 | Metz | 137/624.34 |
|---|---|---|---|
| 2,752,941 | 7/1956 | Michell | 251/282 X |
| 2,826,215 | 3/1958 | Wolfslau | 251/282 X |
| 3,679,171 | 7/1972 | Baranowski | 251/148 |
| 4,187,987 | 2/1980 | Raue | 251/129.15 |
| 4,314,585 | 2/1982 | Nishimiya | 137/625.34 |

FOREIGN PATENT DOCUMENTS

| 60-85206 | 6/1985 | Japan . | |
|---|---|---|---|
| 721241 | 1/1955 | United Kingdom . | |
| 895517 | 5/1962 | United Kingdom . | |
| 903065 | 8/1962 | United Kingdom | 137/625.34 |
| 1278198 | 6/1972 | United Kingdom . | |
| 1396621 | 6/1975 | United Kingdom . | |
| 2029552 | 3/1980 | United Kingdom . | |
| 2066930 | 7/1981 | United Kingdom . | |

*Primary Examiner*—Alan Cohan
*Attorney, Agent, or Firm*—Bachman & LaPointe

[57] ABSTRACT

A structure of an electromagnetic valve for opening and closing a passage of a fluid flow which is applicable to a air suspension system of a vehicle. The electromagnetic valve includes a plunger linked with an armature, a first valve attached to the plunger for defining a first chamber and a second chamber in a body of the electromagnetic valve, together with a valve seating member installed within the body, a second valve attached to the plunger for opening and closing the fluid flow passage opened to the first chamber, and a spring for biasing the plunger in an open direction of the first valve and second valve, a second fluid flow passage being opened to the first chamber for introducing the fluid from the first fluid flow passage, a fluid pressure in the fluid passage being introduced to the second chamber via another passage, and an effective pressure applied area of the first valve (A2) being substantially equal to that (A1) of the second valve. A noise extinguishing projection in a substantially letter Y shape is installed on a valve seating portion of the valve seating member. In addition, the second valve is spirally engaged with the plunger and a spring receiving member for receiving one end of the spring functions as a lock nut of the second valve.

11 Claims, 4 Drawing Sheets

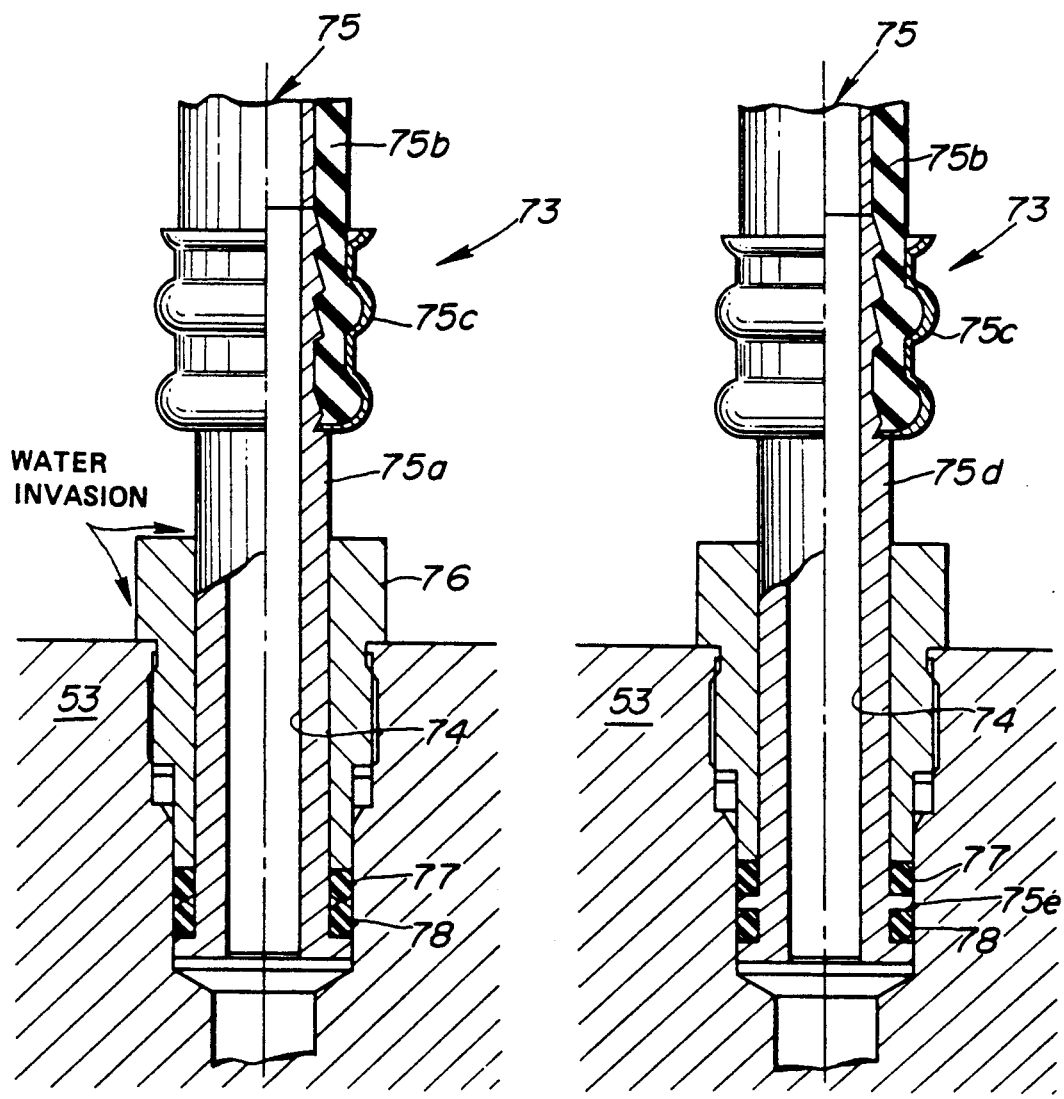

STRUCTURE OF AN ELECTROMAGNETIC VALVE FOR OPENING AND CLOSING A FLUID FLOW PASSAGE

BACKGROUND OF THE INVENTION

The present invention relates to a structure of an electromagnetic valve for opening and closing a fluid flow passage in a hydraulic/pneumatic system using oil or air.

In general, a purpose of an operation is achieved by controlling an operation fluid in a hydraulic or pneumatic system. In such a hydraulic/pneumatic system, an electromagnetic valve is used as means for opening and closing a passage of fluid flow.

Such kinds of hydraulic or pneumatic systems have been adopted in automotive vehicles, for example, in vehicular air (pneumatic) suspension systems.

Since the present invention is particularly applicable to electromagnetic valves in such air suspension systems, a construction of the air suspension system will generally be described below.

Since the air suspension system can achieve a lower suppression of inherent vibrations generated by vehicle body and spring systems as compared with other suspension systems, it can absorb large vibrations transmitted to the vehicle body. In addition, since the air suspension system itself has an attenuation characteristic, it can also absorb fine vibrations generated from load surfaces. Consequently, driving comfortability of the vehicle can be improved.

Furthermore, since the air suspension system can always maintain a height of the vehicle body constant regardless of a load applied to the vehicle, an improvement in appearance of the vehicle (e.g., appropriation of an upright member due to a lowered trailing portion of the vehicle body) and shortening of a stroke of the suspension can be achieved. During driving of the vehicle, the air suspension system can select appropriate spring constant in correspondence to magnitudes of roughness on road surfaces and driving conditions.

In this way, the air suspension system has two control functions: (a) a vehicle height adjustment; and (b) spring constant switching.

A Japanese Utility Model Application first (non-examined) Publication (Jikkai) No. sho 60-85206 published on June 12, 1985 exemplifies the electromagnetic valve used in the air suspension system having the above-described functions.

The disclosed electromagnetic valve is, e.g., used as a cutoff valve in the air suspension system and controls the opening and closing of a passage intervened between a main chamber provided therein and sub tank installed in the air suspension system.

However, the disclosed electromagnetic valve in the above-identified Japanese Utility Model Application publication has many drawbacks. In detail, since the electromagnetic valve has a main valve only through which the flow passage of the operation fluid (air) is opened or closed, a pressure difference occurs in front and rear portions of the main valve when the main valve is operated to close the passage of the air flow. Therefore, a spring force of a spring and magnetic attracting force of a solenoid become necessary which can resist against a load generated by the pressure difference. Consequently, the spring and solenoid become unnecessarily large-sized. It becomes difficult to make these components small-sized, light-weight, and to make the solenoid economical in power consumption. Furthermore, since the large attracting force is required for the solenoid, a large operating noise from the electromagnetic valve is consequently induced.

SUMMARY OF THE INVENTION

It is, therefore, an object of the present invention to provide an improved structure of the electromagnetic valve for opening and closing the fluid flow passage.

it is another object of the present invention to provide the improved structure of the electromagnetic valve having components which are small in size, light in weight, and economical in power consumption.

It is still another object of the present invention to provide the improved structure of the electromagnetic valve which reduces an operating force required when the valve is operated.

It is, furthermore, an object of the present invention to provide the improved structure of the electromagnetic valve which reduces an operating noise when it is operated.

The above-described objects can be achieved by providing a structure of an electromagnetic valve for opening and closing a passage of a fluid flow, comprising: (a) a plunger linked with an armature; (b) a first valve, attached to the plunger, for defining a first chamber and a second chamber in a body of the electromagnetic valve, together with a valve seating member installed within the body; (c) a second valve, attached to the plunger, for opening and closing a first fluid flow passage opened to the first chamber; and (d) a spring for biasing the plunger in valve open directions of the first and second valves, a second fluid flow passage being opened to the first chamber for introducing the fluid from the first fluid flow passage, a passage being opened to the second chamber for introducing a fluid pressure in the first fluid passage to the second chamber, and an effective pressure applied area of the first valve being approximately equal to that of the second valve.

The above-described objects can be achieved by providing a structure of an electromagnetic valve for opening and closing a passage of a fluid flow, comprising: (a) a housing; (b) an armature; (c) a plunger member connected to the armature; (d) a main piston attached to the plunger member for opening and closing the passage of fluid flow from a first fluid inlet to a connector; (e) an auxiliary piston attached to the plunger member; (f) a piston receiving member attached to the housing for defining a first chamber and a second chamber together with the auxiliary piston, fluid pressures in both first chamber and second chamber being equal to the fluid pressure in the first inlet; (g) means for biasing the plunger member in open directions of the first passage defined by the main piston and the first chamber defined by the auxiliary piston and piston receiving member, an effective pressure applied area of the main piston being substantially equal to that of the auxiliary piston; and h) a solenoid member installed on the housing so as to surround the plunger member and armature for driving the plunger member to close the first passage against a biasing force of the means when an electric power is supplied thereto.

The above-described objects can also be achieved by providing a structure of a cutoff valve for opening and closing a passage of an air flow in a vehicular air suspension system, comprising; (a) a housing; (b) an armature; (c) a plunger member connected to the armature; (c) a main piston attached to the plunger member for opening and closing the passage of the air flow from a first air inlet connected to a sub tank of the air suspension system to a connector connected to an air chamber of an air suspension mechanism for each tire wheel portion; (e) an auxiliary piston attached to the plunger; (f) a piston receiving member attached within the housing for defining a first chamber connected to the sub tank via a second air inlet formed :· the housing and a second chamber, together with the auxiliary piston, fluid pressures in both first and second chambers being equal to the fluid pressure in the first air inlet; (g) a spring for biasing the plunger member in open directions of the first passage defined by the main piston and the first chamber defined by the auxiliary piston and piston receiving member; and h) a solenoid member installed on the housing so as to surround the plunger member and armature for driving the plunger member to close the first passage against the biasing force of the spring when an electric power supply is received thereto.

The above-described objects can also be achieved by providing a structure of a valve for opening and closing a passage of fluid flow, comprising: (a) a first valve member; (b) a second valve member; (c) first means for providing and transmitting a driving force to move the first and second valve members in their close directions; (d) second means defining a first space together with the first valve member; (e) third means defining a second space linked with the fluid passage together with the second valve member, an upstream side of the second space being interrupted when the first and second valve members are closed; (f) fourth means for always supplying a fluid pressure to the first space which is equal to a downstream side of the second space; (g) fifth means for providing a biasing force to move the first and second valve members, an effective pressure applied area of the first valve member being substantially equal to that of the second valve member.

BRIEF DESCRIPTION OF THE DRAWINGS

FIG. 4 is a cross sectional view of an essential part indicating a connected state of a connector of the cutoff valve shown in FIGS. 1, 2, and 3.

FIG. 5 is a cross sectional view of an essential part indicating another connected state of the connector of the cutoff valve shown in FIGS. 1, 2, and 3.

DETAILED DESCRIPTION OF THE PREFERRED EMBODIMENT

Reference will hereinafter be made to the drawings in order to facilitate understanding of the present invention.

Figure 1:
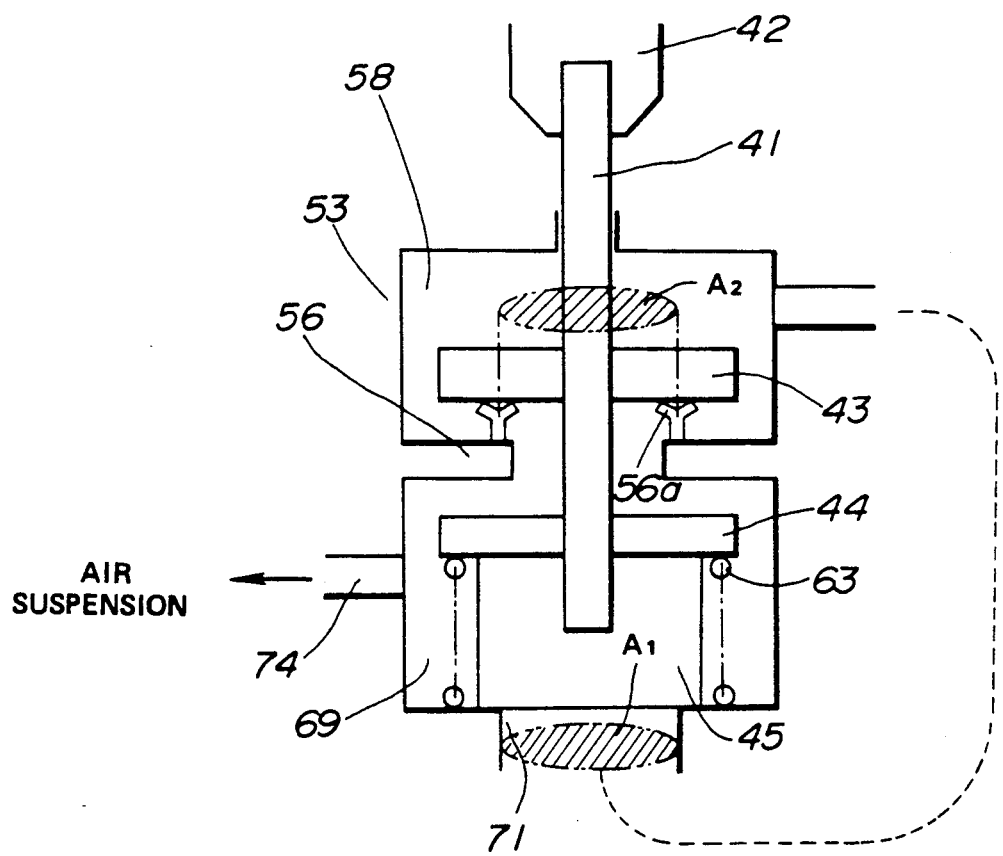
FIG. 1 is a cross sectional view of an electromagnetic valve for opening and closing a fluid flow passage applicable to an air suspension system of a vehicle according to the present invention.

FIG. 1 shows a general concept of an electromagnetic valve for opening and closing a passage of a fluid flow according to the present invention.

The electromagnetic valve includes: a plunger 41 linked with an armature 42; a first valve (auxiliary piston) 43 attached to the plunger 41 for defining, together with a valve seating member (auxiliary rubber 56) installed within a body 53, a first chamber (main inside of the body 53; a second valve (main piston) 45 attached to the plunger 41 for..opening and closing a first fluid passage (passage) 71 opened to the first chamber 69; and a spring 63 which biases the plunger 41 in open directions of the first valve 43 and second valve 45. In FIG. 1, a second fluid flow passage (passage) 74 is opened in the first chamber 69 for introducing the fluid from the first fluid flow passage 71. In addition, a fluid pressure in the first fluid flow passage 71 is introduced via a passage 60 in the second chamber 58. It is noted that an effective pressure applied area (A1) of the second valve 45 is substantially made equal to that (A2) of the first valve 43. The more detailed structure will be described below.

Next, FIGS. 2 to 5 show a preferred embodiment of a detailed structure of the electromagnetic valve for opening and closing the fluid flow passage according to the present invention applied to an air suspension system of a vehicle.

Figure 2:
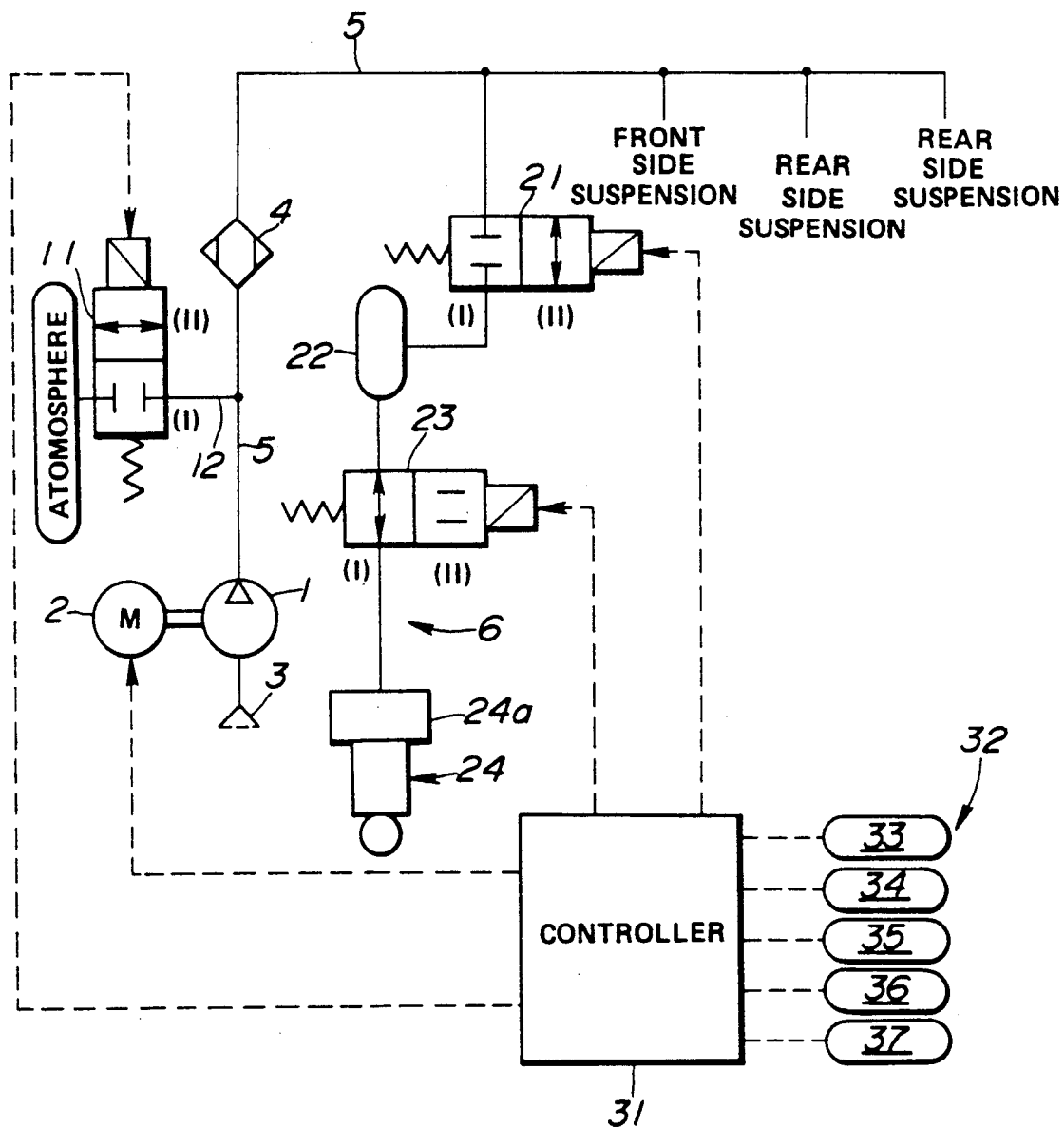
FIG. 2 is an schematic block diagram of an electromagnetic valve for opening and closing the fluid flow passage applied to an air suspension system of a vehicle.

FIG. 2 shows an overall configuration of the air suspension system.

In FIG. 2, solid lines denote an air distributing system and broken lines denote an electric control system.

In FIG. 2, a compressor is installed as denoted by 1 which rotates in response to a driving force of a motor 2 so as to inspire air from an air filter 3. Then, the compressor 1 applies pressure to the air and supplies the pressurized air to respective four suspension mechanisms 6 (numerals for the other three suspensions are omitted) via a tube 5. Two-position and two-port type exhaust valve 11 is intervened in the tube 5 in parallel to the compressor 1.

The exhaust valve 11 is placed at a position denoted by (I) when no electric power is received so as to interrupt a tube 12 branched from the tube 5 and is switched and placed at another position (II) when the electric power is received so as to open the tube 12 and expose an expiration side thereof to the air. The above-described four suspension mechanisms 6 are installed at positions of the vehicle corresponding to respective four wheels of the front and rear parts. In FIG. 2, only one front suspension mechanism 6 is shown in detail but the structures of the other suspension mechanisms are the same (omitted for explanation conveniences).

The suspension mechanism 6 includes a supply valve 21, sub tank 22, cutoff valve 23, and air suspension body 24. These components are interconnected via predetermined tubes.

The supply valve 21 is used having the same type as the exhaust valve 11 for communicating and interrupting the tubes 5 with and from the air suspension 24. The cutoff valve 23 is intervened between the sub tank 22 and air suspension 24. The cutoff valve 23 is placed at the position (I) when no electric power is supplied thereto so that the sub tank 22 and air suspension 24 are communicated to reduce a spring constant of the air suspension 24. On the other hand, when the electric power is supplied to the cutoff valve 23, the communication between the sub tank 22 and air suspension 24 is interrupted so that the spring constant is, at this time, increased.

The air suspension 24 includes a main chamber 24a whose volume is changed according to the air pressure thereto. The vehicle height adjustment is carried out by means of air within the main chamber 24a. The electrical power supply control for each valve 11, 21, and 23 and motor 2 is carried out by means of a controller 31.

The controller 31 receives output signals from the sensor group 32 detecting each predetermined operating state of the vehicle.

The sensor group 32 includes a vehicle height sensor 33, steering angle sensor 34, brake sensor 35, vehicle speed sensor 36, and accelerator sensor 37.

It is noted that the height sensor 33 detects the vehicle height and the steering angle sensor 34 detects a steering direction and its magnitude of a steering wheel. The brake sensor 35 detects whether a vehicle brake element (pedal) is operated. Furthermore, the vehicle speed sensor 36 detects the vehicle speed. The accelerator sensor 37 detects whether an accelerator (accelerator pedal) is operated (depressed beyond a predetermined stroke). The controller 31, for example, is constituted by a microcomputer. The controller 31 calculates process values required for the vehicle height adjustment on the basis of the sensor information derived from the sensor group 32 and for the variable adjustment of the spring constant in accordance with a given program stored in a memory thereof. The controller 31 carries out the power supply control for each valve 11, 21, and 23 and motor 2 according to its necessity.

In the preferred embodiment, the structure of the cutoff valve 23 is an essential point of the present invention.

Figure 3:
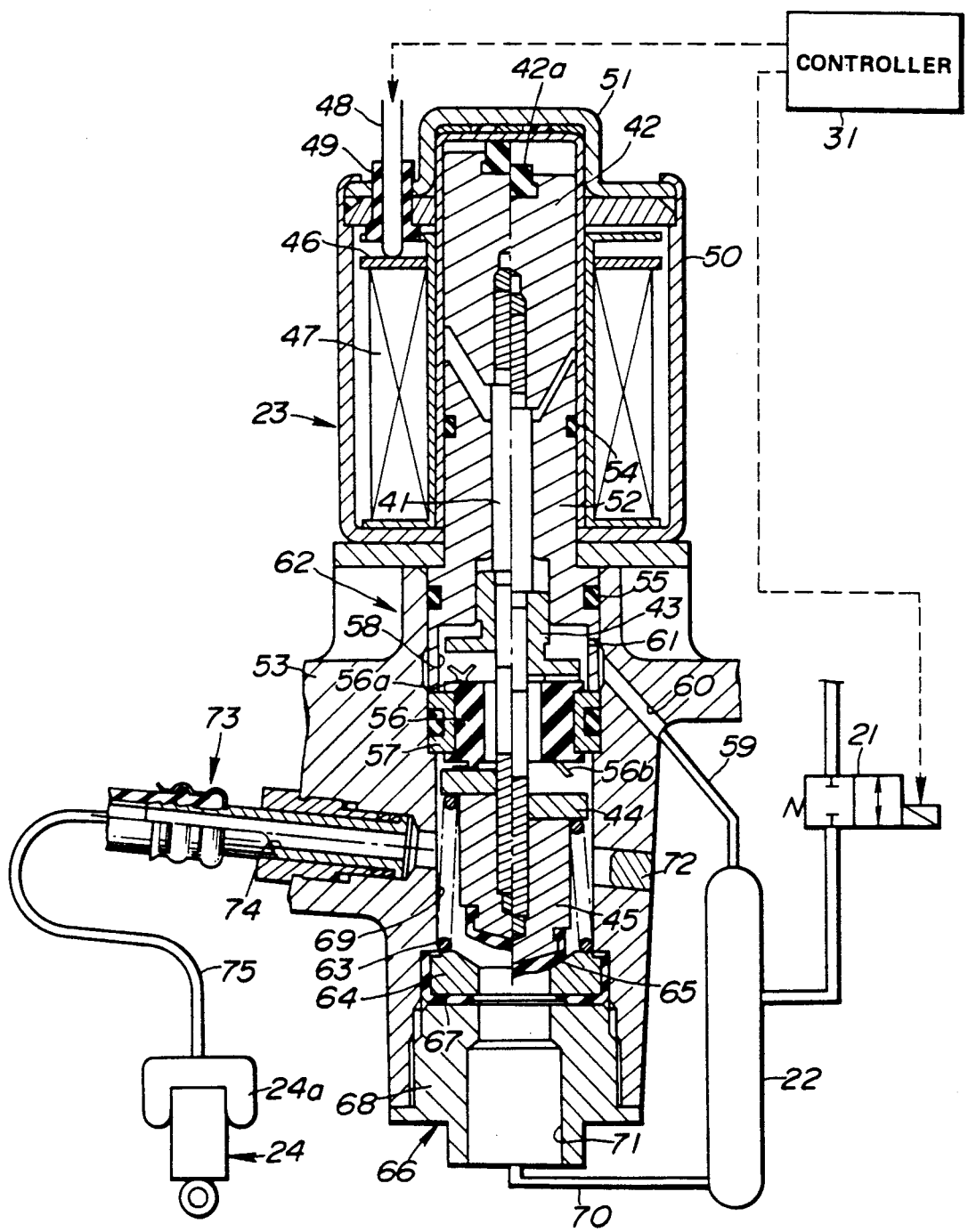
FIG. 3 is a cross sectional view of a cutoff valve shown in FIGS. 1 and 2.

FIG. 3 specifically shows the cross sectional view of the cutoff valve 23.

In FIG. 3, the cutoff valve 23 includes the plunger 41 which is movable in an axial direction of the cutoff valve 23. The armature 42, auxiliary piston (first valve) 43, spring receiving ring 44 and main piston (second valve) 45 are sequentially adhered to the plunger 41. As shown in FIG. 3, a left side of FIG. 3 with respect to a center axis line indicates a state of the valve 23 which is opened and a right side of FIG. 3 indicates a state of the valve 23 which is closed.

The armature 42 placed on both sides of the plunger 41, spring receiving ring 44, and main piston 45 are screwed to the plunger 41. The spring receiving ring 44 functions as a lock nut of the main piston 45. A noise extinguishing rubber 42a is installed on the upper part of the armature 42. In addition, the power supply control of a solenoid coil 47 is controlled by means of the controller 31 via a lead 48. It is noted that an introduction part of the lead 48 in the solenoid coil 47 is sealed by means of a seal rubber 49. Furthermore, the periphery of a plunger cylinder 52 is covered with caps 50, 51. The plunger cylinder 52 is installed below the armature 42 as shown in FIG. 3. The plunger cylinder 52 is fixed to the body 53 of the cutoff valve 23. Seal rubbers 54 and 55 are disposed on the periphery of the plunger cylinder 52. The plunger cylinder 52 defines the auxiliary chamber (second chamber) 58 together with the auxiliary rubber (valve seating member) 56 and an auxiliary ring 57. The compressed air from the sub tank 22 is supplied to the auxiliary chamber 58 via a tubular passage 59, passage 60, and hole 61.

A noise extinguishing projection 56a in a lip form whose cross section is substantially of a letter Y shape is provided on the upper part of the auxiliary rubber 56. When the noise extinguishing projection 56a is elastically deformed and progressively contacted with the auxiliary piston 43, the noise extinguishing projection 56a absorbs a sound generated when they are contacted with each other.

In addition, as described above, the effective pressure applied area (A2) of the valve seating portion in the second chamber 58 is determined from a diameter of a part of the auxiliary rubber (valve seating member) 56 on which the noise extinguishing projection 56a is formed. On the other hand, the other noise extinguishing projection 56b having the same function but the different shape of that 56a described above is formed on a lower part of the auxiliary rubber (valve seating member) 56. The noise extinguishing projection 56b is contacted with the spring receiving ring 44 when the cutoff valve 23 is opened. One end of the spring 63 is contacted with the spring receiving spring 44 and the other end of the spring 63 is contacted with the valve seating portion 64. The spring 63 biases the plunger 41 in the upper direction as viewed from FIG. 3 (valve open direction of the cutoff valve 23). Still another noise extinguishing rubber 65 is installed on the lower part of the main piston (second valve) 45. The noise extinguishing rubber 65 absorbs the sound generated when the main piston (second valve) 45 is seated on the valve seating portion 64. The effective pressure applied area (A1) of the valve seating portion 64 is determined from the diameter of a part of the noise extinguishing rubber 65 of the main piston (second valve) 45 in the main chamber 69. The values of the effective pressure applied areas A1 and A2 are set so as to have such a relationship that A1 is equal or approximate to A2. A rubber member 67 is installed on a lower peripheral part of the valve seating portion 64. A plug 68 is screwed to the body 53 at the lower part of the rubber member 67. In detail, the rubber member 67 has a function to damp and support the valve seating portion 64 on the body 53 so as to suppress the vibrations generated on the valve seating portion 64, and provide the sealing structure between the valve seating portion 64 and body 53. The main valve generally denoted by 66 defines the main chamber (first chamber) 69, the main chamber 69 being capable of communicating with the sub tank 22 via the tubular passage 70 and passage 71 in the plug 68. It is noted that a right side part of the main chamber 69 is closed by means of a blind plug 72 and a left side part of the main chamber 69 is communicated with the air suspension 24 via the passage 74 and tubular passage 75 both passages formed within the connector 73. FIG. 4 shows an enlarged view of the connector 73 of the cutoff valve 23.

The connector 73 includes a fixture 76 spirally engaged with the body 53 for fixing a hose (not shown). A water-proof O-ring 77 and another O-ring 78 are hermetically inserted in a lower tip of the fixture 76. A steel tube 75a is penetrated through an inside of the fixture 76 as the tubular passage 75. The tip of the steel tube 75a is formed in a flange form and contacted with the above-described O-ring 78. In addition, an outside of the steel tube 75a is covered with a rubber hose 75b and an end part of the rubber hose 75b is staked with a fixture 75c.

Next, an operation of the electromagnetic valve in the above-described preferred embodiment will be described in detail.

The air suspension system in the preferred embodiment carries out each control of the height adjustment and switching of the spring constant. The opening and closing of the cutoff valve 23 are carried out according to a control pattern to be processed.

For example, in a case where the height adjustment is carried out, the vehicle height is always measured on the basis of the output signals from the sensor group 33 so that the controller 31 corrects the vehicle height to a reference vehicle height. When the vehicle height is higher than the reference height, both the exhaust valve 11 and supply valve 21 are opened with the cutoff valve 23 maintained in the open state so that air within the air suspension 24 and sub tank 22 is expired therefrom and the vehicle height becomes lowered. On the other hand, when the vehicle height is lower than the reference height, the compressor 1 is turned on and the supply valve 21 is open. Then, the high pressure air is supplied to the air suspension 24 and sub tank 22 so that the height of the vehicle is increased. In this case, the cutoff valve 23 moves the plunger 41 in the upward direction shown in FIG. 2 by means of the spring 63 when no power is supplied to the solenoid coil 47 so that the main valve 66 is opened. thereafter, when the electric power is supplied to the solenoid coil 47 so that a generated solenoid force Fsol attracts the armature 42 and the main valve 66 is closed.

The effects generated when the cutoff valve 23 is operated in the way described above will be described below.

If the pressure at an upstream side of the cutoff valve in the previously proposed cutoff valve described in the BACKGROUND OF THE INVENTION is P1 and the pressure at a downstream of the previously proposed valve is P2, the following equation (1) when the valve is opened and the following equation (2) when the valve is closed are established, respectively.

$$Fsp > (P2 - P1) \times A1 \quad (1)$$

wherein $P2 > P1$ and $A1$ denotes the effective pressure applied area.

$$Fsol > Fsp + (P1 - P2) \times A1 \quad (2)$$

wherein $P1 > P2$.

As appreciated from the equations (1) and (2), the solenoid force Fsol generated when the valve is closed requires the force (loading) having the magnitude which is the addition of the spring force Fsp to the pressure difference between the upstream and downstream sides of the valve. As described above, to cope with such loading the large spring force and attracting force of the solenoid are required.

On the other hand, in a case where the cutoff valve 23 shown in FIGS. 3 to 5 is used in the preferred embodiment, the auxiliary chamber (second chamber) 58 in the auxiliary valve 62 always receives air from the sub tank 22. The force exerted by the air is equal to the pressure (pressure at the passage 71 located at a lower part of FIG. 3) at the upstream side of the main valve 66.

Hence, the spring force Fsp required when the cutoff valve 23 is opened corresponds only to a force required to resist against a friction applied to the armature 42 etc., since the effective pressure applied areas of the main valve 66 and auxiliary valve 62 are substantially equal to each other (A1=A2). The solenoid force Fsol required to close the cutoff valve 23 may slightly be larger than the spring force Fsp. This means that the respective required forces may remarkably be reduced as compared with those forces expressed in the equations (1) and (2). Consequently, the small-sized and light-weight spring 63 and solenoid coil 47 and power economical solenoid coil 47 can be achieved. In addition, the operating sound can be reduced. That is to say, since the noise extinguishing projections 56a and 56b, the noise extinguishing rubber 42a, noise extinguishing rubber 65, and auxiliary rubber 56 are installed as elastic members for extinguishing sound noise, smaller operating noise can be achieved.

The operation of the noise extinguishing projection 56a will be described in detail.

Since the noise extinguishing projection 56a is formed in the letter Y shape, the noise extinguishing projection 56a is contacted with the auxiliary piston 43 in such a way that the upper tip portion thereof is gradually and elastically contacted with the auxiliary piston (first valve) 43. Consequently, the noise generated when they are contacted with each other can extremely be reduced.

Then, after the auxiliary piston (first valve) 43 is contacted with each other,.the pressure within the air chamber 24a of the air suspension 24 is acted to depress the lip portion of the noise extinguishing projection 56a to the auxiliary piston 43 so that the sealing characteristic can largely be improved ,since the Y shaped lip of the projection 56a seals the air chamber 24a even when the internal pressure of the air chamber 24a of the air suspension is largely changed. In addition, since the water-proof O-ring 77 of the connector 73 is disposed in the outer direction of the air-sealing O-ring 78, the invasion of water from a part denoted by arrows in FIG. 4 is prevented by means of the O-ring 77 so that the water will not be introduced in the O-ring 78. Therefore, a sealing surface of the O-ring 78 is effectively protected against rust etc.. The hermetical sealing thereat can also be assured. Although only the O-ring 78 is installed in the known connector, the addition of the new O-ring 77 does not remarkably affect the manufacturing cost of the connector 73. It is more advantageous for preventing the rust of the connector 73.

It is noted that the O-rings 77, 78 are installed as shown in FIG. 4 but may alternatively be installed so that a wall 75e for partitioning the O-rings is provided at the rear part of the flange portion of the tip of the steel tube 75d of the tubular passage 75, as shown in FIG. 5, and the wall 75e partitions the two O-rings. Thus, this structure prevents the air sealing O-ring 77 from being twisted. In addition, even in a case where after the installation of the connector 73 the steel tube 75d is rotated, the O-ring 77 can be prevented from being twisted in its peripheral direction. Therefore, the hermetical sealing characteristic can be improved.

According to the present invention, since the electromagnetic valve comprises the main valve and auxiliary valve and the relationship between the effective pressure applied area A1 of the valve seating portion of the main valve and effective pressure applied area A2 of the valve seating portion of the auxiliary valve is set so as to give A1=A2, the forces generated when the valve is operated (opened and closed) can effectively be reduced with the pressure difference between the front and rear parts of the electromagnetic valve balanced by means of the auxiliary valve.

Consequently, such components as spring and solenoid of the electromagnetic valve can be small sized and light weighted and electric power required for the solenoid element can be reduced. In addition, the operating sound may be reduced in the electromagnetic valve by means of the elastic noise extinguishing projections and rubber members.

What is claimed is:
1. An electromagnetic valve comprising:
   a hollow housing;
   a valve seating member disposed in said hollow housing so as to define a first main chamber and a second chamber, said valve seating member having a central bore;

a plunger reciprocally mounted within said hollow housing and received in said central bore and in said first main chamber and said second chamber;

a first valve member mounted on said plunger and movable therewith within said second chamber for opening and closing a fluid passageway between said first and second chambers and a second valve member mounted on said plunger and movable therewith within said first chamber;

spring means for biasing said plunger to a first position for opening a fluid passageway between a valve seat and said second valve member for communicating fluid from a pressurized fluid supply means via said first chamber to a first passage means and for moving said first valve member so as to open said fluid passageway between said first chamber and said second chamber;

electromagnetic means for biasing said plunger to a second position for closing said second valve member for preventing communication of fluid from said pressurized fluid supply means to said first passage means and for closing said first valve; and second passage means for continually communicating fluid from said pressurized fluid supply means to said second chamber so that fluid pressures between the first chamber and the second chamber are balanced regardless of the position of the second valve.

2. An electromagnetic valve according to claim 1 wherein said valve seating member includes noise suppression means.

3. An electromagnetic valve according to claim 2 wherein said second valve member seals on said noise suppression means when said plunger is in said first position.

4. An electromagnetic valve according to claim 1 wherein said second valve member includes means for receiving said spring means.

5. An electromagnetic valve according to claim 1 wherein said first passage means communicates with air suspension means of a vehicle.

6. An electromagnetic valve according to claim 2 wherein said noise suppression means comprises a Y-shaped elastic member mounted on said valve seating means.

7. An electromagnetic valve according to claim 2 wherein said second valve means includes a rubber member for sealing said pressurized fluid supply means from said first passage when in said second position.

8. An electromagnetic valve according to claim 7 wherein said hollow valve housing includes a plug member which mates with said second valve when in said second position for sealing said pressurized fluid supply means from said first passage.

9. An electromagnetic valve according to claim 1 wherein said electromagnetic means includes an armature linked with said plunger and a solenoid member surrounding said armature for biasing said plunger to said second position.

10. An electromagnetic valve according to claim 9 wherein a rubber member is provided on one end of the armature so as to reduce noise when said plunger is moved from said second position to said first position.

11. A structure of an electromagnetic valve for opening and closing a passage of a pressurized fluid flow, comprising:
 (a) a plunger linked with an armature;
 (b) a solenoid body provided so as to attract the armature therenear when energized;
 (c) a first valve body, attached to the plunger and installed within a valve housing, the first valve body and a first valve seat member defining a first chamber linked with pressurized fluid supply means and with pressurized fluid receiving means and the first valve body being biased to be separated from the first valve seat member so as to open the first chamber to communicate the pressurized fluid supply means with the fluid receiving means by means of a spring member between the first valve body and the first valve seat member and the first chamber being closed when the solenoid is energized; and
 (d) a second valve body, attached to the plunger and installed within the valve housing, the second valve body and a second valve seat member defining a second chamber which is linked with the pressurized fluid supply means so as to always receive the pressurized fluid from the pressurized fluid supply means so that fluid pressures between the first and second chambers are balanced regardless of the open and close of the first chamber.

* * * * *